Sept. 3, 1968 H. J. ORCHARD ET AL 3,400,335

INTEGRATABLE GYRATOR USING MOS AND BIPOLAR TRANSISTORS

Filed Dec. 2, 1966 2 Sheets-Sheet 1

INVENTORS
HENRY J. ORCHARD
DESMOND F. SHEAHAN
BY
Spencer E. Olson
ATTY.

Sept. 3, 1968 H. J. ORCHARD ET AL 3,400,335

INTEGRATABLE GYRATOR USING MOS AND BIPOLAR TRANSISTORS

Filed Dec. 2, 1966 2 Sheets-Sheet 2

3,400,335
Patented Sept. 3, 1968

3,400,335

INTEGRATABLE GYRATOR USING MOS AND BIPOLAR TRANSISTORS

Henry J. Orchard, San Mateo, and Desmond F. Sheahan, Redwood City, Calif., assignors to Automatic Electric Laboratories, Inc., a corporation of Delaware Filed Dec. 2, 1966, Ser. No. 598,792
3 Claims. (Cl. 330—24)

ABSTRACT OF THE DISCLOSURE

A two-port gyrator circuit has two similar amplifiers, one exhibiting a zero degree phase shift from its input to its output and the other exhibiting a 180° phase shift from its input to its output, having their respective inputs and outputs connected together in closed loop, with the output of one connected to the input of the other to form the gyrator output port and the output of the other connected to the input of the one to form the gyrator input port. Each amplifier has a high impedance input stage including a field-effect transistor, and a high impedance output stage including a pair of complementary bipolar transistors. When a capacitor is connected to the gyrator output port, the gyrator simulates an inductor with a Q factor of 500 at frequencies ranging from D.C. to 100 kHz.

This invention relates generally to gyrators and more particularly to a semiconductor gyrator for simulating a high-Q inductor.

Conventional electrical filter networks are presently made as two-port networks of inductors and capacitors, designed to operate between resistive terminating impedances. In special cases, it is possible to replace some or all of the reactive elements by electro-mechanical resonators, but usually it is not. In attempting to reduce the size and weight of an inductor-capacitor filter, the main limiting factor is the inductor which, in order to provide the necessary high quality factor, must have a relatively large and heavy iron or ferrite core.

An alternative to attempting to make smaller inductors is to devise a circuit which has the same transmission characteristic but which uses no inductors. Of the many suggestions for accomplishing this, virtually all are variants of a basic scheme described in an article entitled "RC Active-Filters" by J. Linvil in the Proceedings of the IRE 1954, pp. 555–564. These circuits use resistors and capacitors and some active device such as a negative impedance converter (NIC) or a controlled source (i.e., an idealized amplifier). They have come to be known as RC active filters. The principal disadvantage of all presently known RC active filters is that their performance is excessively sensitive to tolerances on the components.

A relatively new approach to this problem of making inductorless filters is to take the conventional inductor-capacitor ladder filter, which one would use if no size reduction were required, and replace each inductor by the input to a gyrator the output of which is loaded with a capacitor.

The gyrator is a non-reciprocal two-port network with an admittance matrix:

$$\begin{bmatrix} 0 & g_1 \\ -g_2 & 0 \end{bmatrix}$$

where $g_1$ and $g_2$ are the gyrator transconductances. It was first proposed and described by B. Tellegen in an article entitled "The Gyrator, a New Electric Element" in Philips Research Report, 1948, pp. 81–101. The gyrator has the property that an admittance $y$ connected to one port is transformed into an impedance $y/g_1g_2$ presented at the other port; consequently, a capacitance C can be transformed into an inductance $L=C/g_1g_2$.

A realization of a practical high-Q semiconductor gyrator for simulating an inductor has previously been shown by applicants in Electronics Letters, July, 1966, Vol. 2, No. 7, pp. 274–275. With the circuit therein described, it has been possible to realize a Q factor of 500 at frequencies up to 30 kHz. However, stable Q factors exceeding 500 were realized only at frequencies up to about one kHz. The gyrator comprises two voltage-controlled current sources both having high-input and high-output impedances. The high-input impedances are obtained by a Darlington connection of bipolar transistors and the high-output impedances are obtained by connecting together the collectors of two common-emitter connected complementary bipolar transistors. In addition, feedback paths act to simultaneously raise both the input and output impedances of the amplifiers. One of the amplifiers has a zero degree phase shift from input to output and has its output connected to the input of the other amplifier and similarly, the second amplifier has a 180° shift from input to output and has its output connected to the input of the first amplifier to form a closed gyrator loop. If the loop is broken at any point, the A.C. signals at the two ports of the break should be 180° out of phase with each other.

Applicants have observed that the use of bipolar transistors in the gyrator circuit may cause a deviation from the desired 180° phase change, and that this deviation affects the Q of the simulated inductor. This is especially true at higher frequencies where the effect of minority carrier transit times makes it difficult to stabilize feedback loops within the gyrator. Applicants have concluded that these phase changes occur in gyrators whose input circuits contain all bipolar transistors, because several stages must be used in order to obtain an input impedance in the megohm range, as is required for gyrator action, and furthermore, that the presence of resulting high impedances within the gyrator amplifiers themselves enhance these phase changes. In addition, the higher these internal impedances are, the smaller need be the value of stray capacitance required to cause a significant phase in the gyrator loop.

The effect of these phase changes on the gyrator will be in the form of Q enhancement. While it is desirable to have a large Q, it is explained by applicants in Electronics Letters, October 1966, vol. 2, No. 10, that if, in a gyrator having a Q of 500, a phase shift of .002 radian occurs, the Q will become infinite and the circuit will oscillate.

A semiconductor gyrator which is somewhat similar to the one shown in the above reference is described in an article entitled "Direct Coupled Gyrator Suitable For Integrated Circuits and Time Variation" by T. N. Rao and R. W. Newcomb, in Electronics Letters, Volume 2, No. 7, July 1966, pp. 250–251. This circuit also utilizes bipolar transistors in moderately high-impedance amplifier circuits and hence should experience similar phase shifts. The Q achievable by the circuit is shown to be only 60 at a frequency of one kHz.

Therefore, in accordance with this invention, to obtain a stable Q, particularly at high frequencies, the Darlington input circuits of the gyrator have been eliminated to thereby reduce the number of bipolar transistors in the gyrator circuit. Instead, the gyrator circuit utilizes a field-effect transistor for the input to each gyrator amplifier, whereby a high input impedance is obtained without the introduction of excessive phase shift to the amplifier. This gyrator circuit can realize a stable value of Q of 400 at frequencies within a frequency range from D.C. up to at least 100 kHz.

It is therefore an object of the invention to provide a stable gyrator suitable for use at frequencies at least as high as one hundred kHz.

It is another object of the invention to provide a gyrator the quality factor and transconductances of which are virtually insensitive to changes in temperature and supply voltage.

It is another object of the invention to provide a high quality gyrator for use in filter circuit applications having frequency ranges at least up to one hundred kHz.

It is another object of the invention to provide a gyrator in which the Q of the simulated inductor can be varied independently of the value of the simulated inductance.

It is another object of the invention to provide a gyrator which is simple in design and at the same time lends itself readily to fabrication as an integrated circuit component.

In a preferred embodiment of the invention, these objects are realized by a gyrator circuit which comprises two amplifiers connected in a closed loop, each amplifier having a high input impedance and a high output impedance. One amplifier has zero degree phase change from its input to its output and the other amplifier has a 180° phase change from its input to its output. The amplifiers are D.C. coupled throughout to permit the flow of D.C. stabilizing currents. A metal-oxide semiconductor field-effect transistor is used as the input stage of each amplifier to provide a high input impedance; a pair of complementary bipolar transistors are used in the output stages of each amplifier to provide a high output impedance; and feedback transistors are used in the input stage of each amplifier to stabilize the transconductances of the gyrator against variations in the transconductances of the metal-oxide semiconductor field-effect transistors. A capacitor in the emitter circuit of one of the output transistors may be provided to compensate for phase changes in the gyrator loop, and to adjust the Q of the simulated inductance. The junctions between the two amplifiers provide the input and the output ports for the gyrator. The capacitive reactance of a capacitor which is connected to the output port will be "gyrated" into an inductive reactance as seen from the input port of the gyrator.

Although the use of field-effect transistors in gyrator circuits is known per se, for example, through U.S. Patent 3,255,364, the field-effect transistor achieves the required high output impedance, but only for low output current levels, thus limiting the power handling capability of the device. Another disadvantage is that different power supplies and capacitor coupling are required in order to prevent excessive changes in transconductances with temperature changes.

The operation of the gyrator circuit according to the present invention, as well as the manner in which the objects and features of this invention are achieved, will be better understood with reference to the following detailed description and the accompanying drawings, in which.

Figure 1:
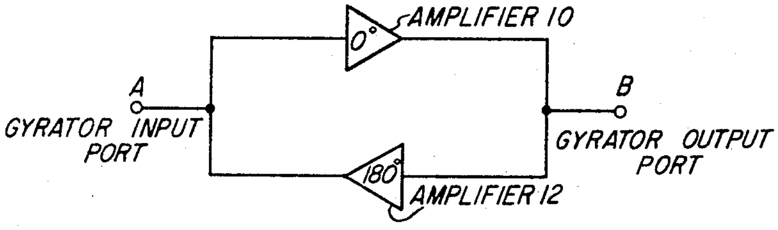
FIG. 1 is a block diagram of a basic gyrator circuit.

Referring to FIG. 1, a gyrator has been constructed by splitting up the gyrator conductance matrix referred to above and realizing the two off-diagonal elements $g_1$, and $-g_2$ separated by means of two voltage-controlled current amplifiers 10 and 12 connected in a closed loop. Each amplifier has a high-input and high-output impedance. Because the load on the output stage of each amplifier is current-driven, the impedance of the output stage of the amplifier must be high so that load changes are not affected by the impedance of the output stage. Amplifier 10 has a zero degree phase shift from its input to its output while amplifier 12 has a 180° phase shift from its input to its output. The output of amplifier 10 and the input of amplifier 12 are connected together at point B to form one gyrator port which will henceforth be called the gyrator output port. Similarly, the output of amplifier 12 and the input of amplifier 10 are connected together at point A to form the other gyrator port which will henceforth be called the gyrator input port. Because of the phase differences of the two amplifiers, the gyrator ports exhibit a 180° phase shift with respect to one another. Furthermore, if the gyrator loop is broken at any point, the two ports of the break should be 180° out of phase with each other.

When a capacitor is connected to the gyrator output port, the gyrator simulates an inductor when viewed from its input port. The value of the inductance which can be simulated is determined by the value of capacitance connected to the output port, and, according to this invention, the magnitude of the Q of the simulated inductor, which is independent of the value of simulated inductance, is determined by the input and output impedances and by the deviation from the 180° phase change in the gyrator loop. As the phase change is caused by small parasitic capacitances and by $C_A$, there will be a negligible effect on the low frequency Q. The high frequency Q, however, will be affected as the phase change, due to such capacitances, is proportional to frequency.

Figure 2:
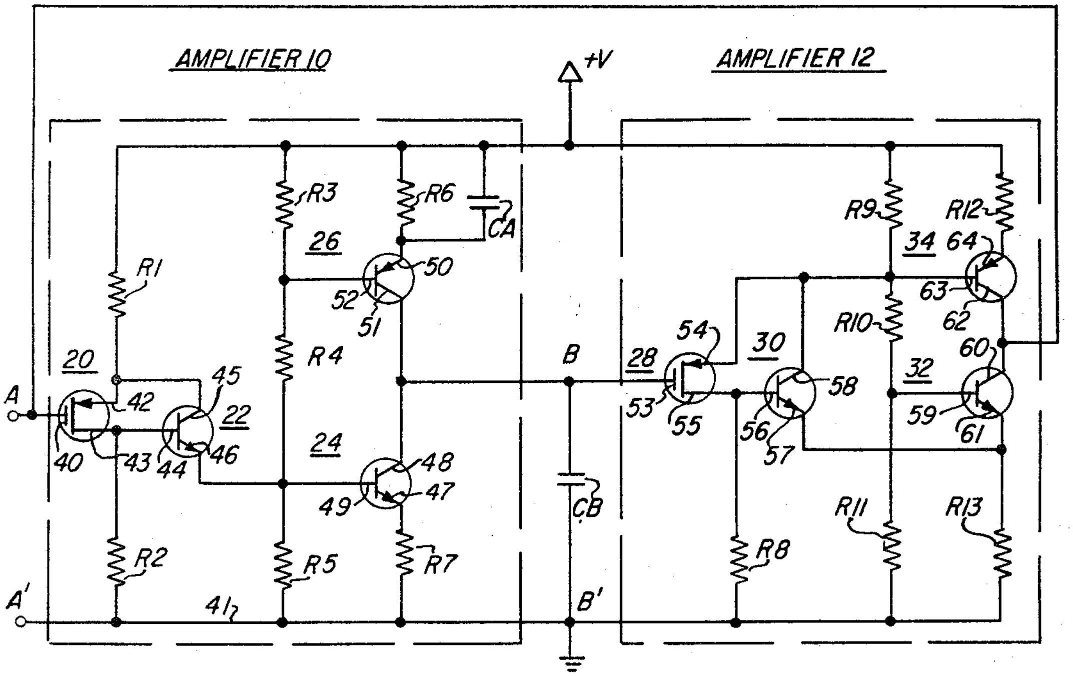
FIG. 2 is a circuit diagram of a gyrator loaded with a capacitor $C_B$ according to one embodiment of the invention.

FIG. 2 shows the wiring diagram for a circuit implementation of the block diagram shown in FIG. 1. The circuit employs two amplifiers 10 and 12 with their respective inputs and outputs connected together to form a closed loop. Amplifier 10 exhibits a zero degree phase shift whereas amplifier 12 exhibits a 180° phase shift. The points of interconnection A–A′, B–B′ between the amplifiers form the terminals for the gyrator input and output ports, respectively.

The input stage of amplifier 10 uses a p-channel enhancement mode metal-oxide semiconductor field-effect transistor (hereinafter abbreviated MOSFET) 20 connected in common-drain configuration. The gate 40 of the MOSFET 20 is connected to point A, one of the gyrator input port terminals. The source 42 of MOSFET 20 is connected to a suitable bias supply +V through resistor $R_1$. The drain 43 of MOSFET 20 is connected to a ground reference terminal 41 through resistor $R_2$. The reference terminal 41 is also connected to point A′ the other input port terminal of the gyrator.

MOSFET 20 is used in the input stage partly because of its extremely high input impedance capabilities, but mainly because the high impedance can be achieved without introducing excessive phase shift to the amplifier which would affect the Q of the simulated inductor. The input impedances obtained with the MOSFETS is on the order of thousands of megohms.

Although MOSFET 20 has high output impedance at its "drain" terminals 42, 43, the high impedance is achieved only for low values of output currents. For this reason, bipolar transistors 24, 26 are used in the output stage of the amplifier. This presents no circuit connection problems because the bias requirements of MOSFET 20 are compatible with those of the bipolar transistors 24, 26, and also transistors 22 used in the amplifier.

The output stage of amplifier 10 uses a pair of bipolar transistors 24 and 26 of opposite conductivity types. Each transistor is connected in a common-emitter configuration, with the emitter 47 of transistor 24 connected to reference ground lead 41 through resistor $R_7$ and with the emitter 50 of transistor 26 connected to the bias supply +V through resistor $R_6$. The collector 48 of transistor 24 is connected to the collector 51 of transistor 26. The collectors of these transistors are "floating" relative to the bias supply so that an output impedance on the order of ten megohms is obtained. Collectors 48

51 of transistors 24 and 26 are also connected to point B, one of the gyrator output port terminals thereby providing one of the output terminals for amplifier 10. The other output terminal is reference lead 41, which is connected to point B′, the other gyrator output port terminal.

The base 49 of transistor 24 is connected to reference lead 41 through resistor $R_5$ and through resistor $R_4$ to the base 52 of transistor 26 which, in turn, is connected to the bias source +V through resistor $R_3$.

Transistor 22 is used in the input stage of amplifier 10 to stabilize the transconductances of the gyrator against variations in the transconductances of the MOSFET 20. The base 44 of transistor 22 is connected to the drain 43 of MOSFET 20 and the collector 45 of transistor 22 is connected to the source 42 of MOSFET 20 to provide D.C. feedback paths around the MOSFET.

Although the MOSFET device does not suffer from temperature-dependent phase changes, its transconductance is temperature-sensitive; the provision of the transistor 22 effectively stabilizes the amplifier against temperature variations.

The drive to the output of amplifier 10 is taken from the drain 43 of MOSFET 20 through the emitter 46 of transistor 22 which is connected directly to the base 49 of transistor 24 which, as mentioned above, is connected to the base 52 of transistor 26 through resistor $R_4$.

The function of capacitor $C_A$, which is connected between the emitter 50 of transistor 26 and the voltage supply, is to correct for deviations from the desired 180° phase change in the gyrator loop. It accomplishes this function by increasing the high-frequency gain of amplifier 10 in the range from 1.1 mHz. to 1.5 mHz. For a particular gyrator design, a fixed capacitor $C_A$ would be used to obtain a predetermined deviation. Since this capacitor affects the phase change in the gyrator loop, it also affects the value of Q which is related to the phase change. If capacitor $C_A$ were variable, it would be possible to adjust the phase change in the gyrator loop and thereby adjust the value of Q of the simulated inductor independently of the value of the simulated inductor. This capacitor could be adjusted to give a peak Q which either increases or decreases with frequency, or remains constant for all frequencies of concern.

Amplifier 12 which is similar to amplifier 10 includes MOSFET 28 and feedback transistor 30 in the input stage and complementary bipolar transistors 32 and 34 in the output stage. The output transistors 32 and 34 are connected in a common-emitter configuration and have their collectors 60 and 62 connected together to provide a high output impedance.

The gate 53 of MOSFET 28, which is one of the input terminals of amplifier 12, is connected to point B, one of the output terminals of amplifier 10 and one of the gyrator output ports, and the drain 55 of MOSFET 28 is connected through resistor $R_8$ to the ground reference lead 41, the other input terminal of amplifier 12.

Amplifier 12 differs from amplifier 10 in that a resistor comparable to resistor $R_1$ of amplifier 10 is not required because the source 54 and the drain 55 of MOSFET 28 used to drive the output of amplifier 12. Source 54 is connected directly to the base 63 of output transistor 34. Source 42 of MOSFET 20 is not used to drive the output because it would have to be connected to the emitter 50 of transistor 26 and the low emitter output impedance would have meant less local feedback to MOSFET 20 and, consequently, the transconductance of MOSFET 20 would have been more temperature sensitive. Drain 55 of MOSFET 28 drives the base 56 of feedback transistor 30 as in amplifier 10. To achieve the required 180° phase change in amplifier 12, the emitter 57 of transistor 30 drives the emitter 61 of output transistor 32. The emitter 61 of transistor 32 is connected to ground reference lead 41 through resistor $R_{13}$, which in turn is connected to point A′, one of the gyrator input port terminals. The collectors 60 and 62 of output transistors 32 and 34 are connected to point A, the other gyrator input port terminal. The gate 40 of MOSFET 20 of amplifier 10 is also connected to point A and similarly the drain 43 of MOSFET 20 is connected to point A′ through resistor $R_2$ so that the output of amplifier 12 is connected to the input of amplifier 10. With the output of amplifier 10 being connected to the input of amplifier 12 and the output of amplifier 12 being connected to the input of amplifier 10, a closed gyrator loop including both amplifiers is formed.

Capacitor, $C_B$, which is shown connected to the gyrator output port terminals B–B′, is effectively "gyrated" into an inductor as seen from the gyrator input port terminal A–A′. The magnitude of the inductance is $L=C_B/g_1g_2$, where $g_1g_2$ is the product of the gyrator transconductances. The circuit shown does not have equal transconductances $g_1$ and $g_2$, but this is not a drawback because the important property is the product of the transconductances.

Figure 3:
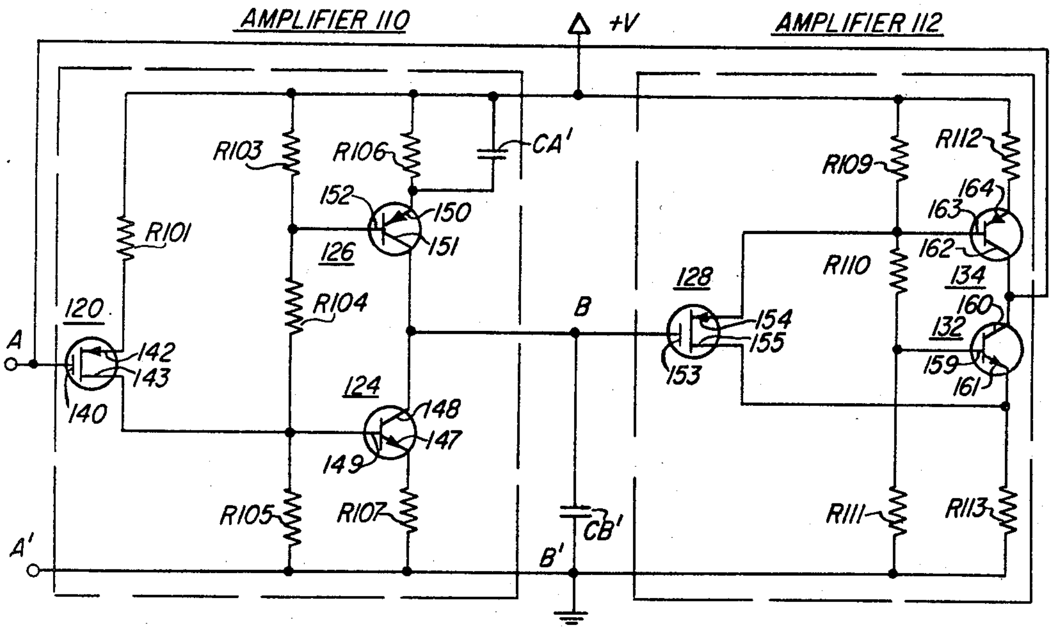
FIG. 3 is a circuit diagram of a gyrator loaded with a capacitor $C_B$ according to another embodiment of the invention.

FIG. 3 shows a circuit diagram of a gyrator which operates without feedback transistors 122 and 130. The gyrator uses two amplifiers 110 and 112 each having a MOSFET 120, 128 respectively in the input stage and a pair of complementary bipolar transistors 124 and 126, and 132 and 134, respectively, in the output stage. The biasing arrangement is similar to that for the circuit shown in FIG. 2; however, bias resistors which would correspond to resistors $R_2$ and $R_8$ of amplifier 10 are not required. The drive to the output of amplifier 110 is taken directly from the drain 143 of MOSFET 120 to the base 149 of output transistor 124. To achieve the desired 180° phase change in amplifier 112, the drive to the output is from the drain 155 of MOSFET 128 directly to the emitter 161 of output transistor 132.

The gyrator circuits according to this invention lend themselves readily to integration. The circuit is direct coupled throughout and the magnitude of capacitor $C_A$, is typically in the 20 to 80 picofarad range. Capacitor $C_B$ is preferably a discrete component so that a number of gyrators of identical circuit design can be manufactured by the same process with the capacitor $C_B$ being connected to the gyrator output terminals to provide a required value of inductance.

Figure 4:
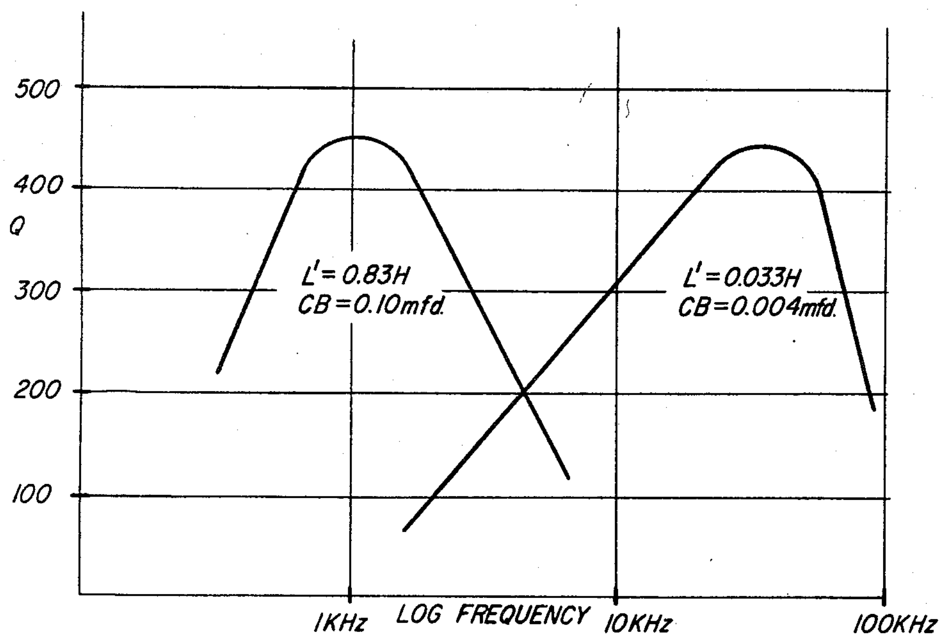
FIG. 4 shows values of Q measured as a function of frequency for a gyrator circuit according to the invention.

FIG. 4 shows measured Q values that are obtained as a function of frequency for the gyrator shown in FIG. 2. The magnitude of Q is shown on the ordinate with logarithmic values of frequency being shown on the absissa for $C_B$=0.1 μfd. and $C_B$=0.004 μfd. The results are summarized in the table below:

| | $C_B$ (μfd.) | L′(H) | Peak Q | Peak-frequency (kHz) |
|---|---|---|---|---|
| I | 0.1 | 0.83 | 450 | 0.750 |
| II | 0.004 | 0.033 | 450 | 25. |

The above gyrator can be used as a direct replacement for an inductor in an electric filter whereby the high Q properties and the stability of the gyrator are passed on to the characteristics of the filter The size and weight of the filter are significantly reduced by replacing the inductor with its capacitor-gyrator equivalent.

From the foregoing, it will be apparent that applicants have provided a high quality gyrator utilizing components which may be readily fabricated in integrated circuit form. This gyrator enables inductances with Q factors of about 500 to be produced by capacitors at frequencies ranging from D.C. to at least 100 kHz. The circuit uses metal-oxide semiconductor field-effect transistors to achieve high input impedances without introducing excessive phase shifts in the amplifiers because these phase shifts affect the Q stability at higher frequencies. Since the circuit is directly coupled throughout, the negative feedback paths presented will stabilize the D.C. bias conditions of the gyrator.

Although the invention has been described with reference to preferred embodiments, it is to be understood that these are merely by way of example and not intended as a limitation to the spirit and scope of the invention as defined by the following claims.

What is claimed is:

1. A gyrator having an input port and an output port, for presenting an inductive reactance at its input port whenever a capacitor is connected to its output port; said gyrator comprising:

first and second amplifiers each having a high-impedance input and a high-impedance output, one of said amplifiers exhibiting a zero degree phase shift from its input to its output and the other amplifier exhibiting a one-hundred and eighty degree phase shift from its input to its output, the output of said first amplifier and the input of said second amplifier being connected together to form said gyrator output port and the output of said second amplifier and the input of said first amplifier being connected together to form said gyrator input port, thereby providing a closed gyrator loop with said gyrator input port and said gyrator output port exhibiting a one-hundred and eighty degree phase shift with respect to one another, each of said amplifiers having an input stage including a field-effect transistor having a gate connected to a respective gyrator port to provide said high-input impedance and an output stage D.C. coupled to its input stage and including a pair of bipolar transistors of opposite conductivity types, the transistors of each said pair having a collector connected to a respective gyrator port and being connected in a common-emitter configuration to provide said high output impedance.

2. The gyrator as claimed in claim 1 wherein said amplifier input stages each further include an additional transistor connected between the field-effect transistor and one of the bipolar transistors of said output stage providing a direct current feedback path around said field-effect transistors, whereby the transconductances of said gyrator are stabilized against variations in the transconductances of the field-effect transistors.

3. The gyrator as claimed in claim 1 wherein a capacitor is included in one of said amplifier output stages for shifting the phase of said closed gyrator loop whereby the Q of the simulated inductor can be adjusted independently of the magnitude of the inductive reactance.

References Cited

UNITED STATES PATENTS

| | | | |
|---|---|---|---|
| 3,231,827 | 1/1966 | Legler | 330—13 |
| 3,300,585 | 1/1967 | Reedyk et al. | 307—88.5 |
| 3,300,738 | 1/1967 | Schlicke | 333—24.1 |
| 3,343,003 | 9/1967 | Arseneau | 333—80 |

ROY LAKE, *Primary Examiner.*

L. J. DAHL, *Assistant Examiner*